US012643645B2

(12) United States Patent
Fang et al.

(10) Patent No.: US 12,643,645 B2
(45) Date of Patent: Jun. 2, 2026

(54) UNDERWATER SONAR DEVICE AND UNDERWATER DETECTING SYSTEM

(71) Applicant: Nanfoon Applied Technologies Ltd., Beijing (CN)

(72) Inventors: Li Fang, Beijing (CN); Zhaofu Zhang, Beijing (CN); Jing Li, Beijing (CN); Qiang Zhang, Beijing (CN); Ming Xu, Beijing (CN); Jinqing Al, Beijing (CN); Zaidi Hong, Beijing (CN)

(73) Assignee: Nanfoon Applied Technologies Ltd., Beijing (CN)

( * ) Notice: Subject to any disclaimer, the term of this patent is extended or adjusted under 35 U.S.C. 154(b) by 414 days.

(21) Appl. No.: 18/333,976

(22) Filed: Jun. 13, 2023

(65) Prior Publication Data

US 2024/0134042 A1 Apr. 25, 2024
US 2024/0230892 A9 Jul. 11, 2024

(30) Foreign Application Priority Data

Oct. 20, 2022 (CN) .......................... 202211289445.7
Oct. 20, 2022 (CN) .......................... 202222776052.0

(51) Int. Cl.
*B63G 8/18* (2006.01)
*B63G 8/00* (2006.01)
(Continued)

(52) U.S. Cl.
CPC .............. *B63G 8/18* (2013.01); *B63G 8/001* (2013.01); *B63G 8/08* (2013.01); *B63G 8/39* (2013.01);
(Continued)

(58) Field of Classification Search
CPC . B63G 8/39; B63G 8/18; B63G 8/001; B63G 8/08
See application file for complete search history.

(56) References Cited

U.S. PATENT DOCUMENTS 5,235,930 A * 8/1993 Pendleton ................. B63B 3/08
114/330
2009/0090286 A1* 4/2009 Korolenko ............... B63G 8/30
114/316

FOREIGN PATENT DOCUMENTS

CN 111038671 A 4/2020
CN 114148490 A 3/2022
GB 2450586 A 12/2008

OTHER PUBLICATIONS

United Kingdom Office Action regarding Application No. GB2308179.7 dated Nov. 21, 2023.

* cited by examiner

*Primary Examiner* — Michael L Sehn
(74) *Attorney, Agent, or Firm* — Harness, Dickey & Pierce, P.L.C.

(57) ABSTRACT

An underwater sonar device and an underwater detecting system. The underwater sonar device comprises a main body, a propeller, a detector and a hydrofoil assembly. The main body is an axisymmetric structure. The propeller, the detector, and the hydrofoil assembly are disposed on the main body. The detector is configured to detect and image an underwater target. The propeller is configured to drive the main body to move along a longitudinal direction and a vertical direction, and control a pitch angle, a roll angle, and a yaw angle of the main body. The hydrofoil assembly is disposed at a back of the main body, and is configured to adjust an included angle between the hydrofoil assembly and the longitudinal direction of the main body automatically based on water resistance on the hydrofoil assembly to keep the sonar device navigating at a fixed depth.

17 Claims, 4 Drawing Sheets

(51) Int. Cl.
    *B63G 8/08*          (2006.01)
    *B63G 8/39*          (2006.01)
    *G01S 15/93*         (2020.01)

(52) U.S. Cl.
    CPC ........ *B63G 2008/002* (2013.01); *G01S 15/93*
                                  (2013.01)

UNDERWATER SONAR DEVICE AND UNDERWATER DETECTING SYSTEM

CROSS-REFERENCE TO RELATED APPLICATIONS

The present disclosure claims the priority to Chinese Patent Application No. 202211289445.7 titled "UNDERWATER SONAR DEVICE AND UNDERWATER DETECTING SYSTEM", and Chinese Patent Application No. 202222776052.0 titled "UNDERWATER SONAR DEVICE AND UNDERWATER DETECTING SYSTEM", both filed on Oct. 20, 2022 with the China National Intellectual Property Administration, which are incorporated herein by reference in their entireties.

FIELD

The present disclosure relates to the technical field of underwater robot, and in particular to an underwater sonar device and an underwater detecting system.

BACKGROUND

At present, underwater targets are usually detected via underwater robots due to complex underwater environments, such as excessive water flow rate, excessive water depth, poor visibility, and excessively cold water.

An underwater robot serves as a carrier which carries various devices to implement the detection, which increases its dead weight and reduces its mobility in navigation. Generally, the carrier adopts a frame structure, and hence is subject to large underwater navigation resistance. When being towed by a navigating towing vessel, a conventional underwater sonar device adjusts its operation state based on its weight, a navigation speed of the towing vessel, and a length of a towing cable. An increase of the navigation speed leads to gradual ascent of the device due to an obliquely upward drawing force applied by the towing vessel. Hence, diving depth of the device is limited, and the device cannot descend to an appropriate distance to sea floor when exploring deep sea.

SUMMARY

An objective of the present disclosure is to provide an underwater sonar device. The sonar device has reduced navigation resistance and improved navigation capability. It is ensured that the sonar device can cruise at a fixed depth when being towed and meet a requirement of deep-sea detection. In addition, when finding a highly probable target, the sonar device is capable switch from towed navigation to autonomous navigation, which meets a requirement on approaching for detailed detection and expanding a range of detection.

Another objective of the present disclosure is to provide an underwater detecting system. The sonar device has reduced navigation resistance and improved navigation capability. It is ensured that the sonar device can cruise at a fixed depth when being towed and meet a requirement of deep-sea detection. In addition, when finding a highly probable target, the sonar device is capable switch from towed navigation to autonomous navigation, which meets a requirement on approaching for detailed detection and expanding a range of detection.

In order to address the above technical issue, an underwater sonar device is provided according to embodiments of the present disclosure. The underwater sonar device comprises a main body, a propeller, a detector and a hydrofoil assembly. The main body is an axisymmetric structure. The propeller, the detector, and the hydrofoil assembly are disposed on the main body. The detector is configured to detect and image an underwater target. The propeller is configured to drive the main body to move along a longitudinal direction and a vertical direction, and control a pitch angle, a roll angle, and a yaw angle of the main body. The hydrofoil assembly is disposed at a back of the main body, and is configured to adjust an included angle between the hydrofoil assembly and the longitudinal direction of the main body automatically based on water resistance on the hydrofoil assembly to keep the sonar device navigating at a fixed depth.

In an embodiment, the hydrofoil assembly comprises a hydrofoil and an elastic component. The hydrofoil is hinged to a position at the back of the main body, and the position corresponds to a center of gravity of the main body. The elastic component is disposed between the hydrofoil and the main body. The hydrofoil is rotatable around the position under the water resistance and an elastic force applied by the elastic component.

In an embodiment, the hydrofoil assembly further comprises a hinge base disposed on the back of the main body. The hydrofoil is connected to the hinge base via a hinge shaft, and the hinge base comprises a limit wall. The elastic component is a torsion spring which serves as a sleeve outside the hinge shaft. A leg of the torsion spring abuts against an inner side wall of the hydrofoil assembly, and another leg of the torsion spring abuts against the limit wall.

In an embodiment, the propeller comprises a longitudinal propeller, a transverse propeller and vertical propellers. The longitudinal propeller is disposed at an aft end of the main body and is configured to drive the main body to move along the longitudinally direction. The transverse propeller is disposed at a lateral side of a forward end of the main body and is configured to control the yaw angle of the main body. Transverse tail fins are disposed at two lateral sides, respectively, of the aft end of the main body. The vertical propellers are disposed at the back of the main body at the forward end and at two transverse tail fins, respectively. The vertical propellers are configured to control the main body to move along the vertical direction and control the pitch angle and the roll angle of the main body.

In an embodiment, a buoyancy material is arranged at an upper side of each of the transverse tail fins.

In an embodiment, the underwater sonar device further comprises a controller. The main body comprises a main control cabin, and the controller is disposed in the main control cabin. The controller is electrically connected with deck equipment of a towing vessel, the detector, and the propeller. The controller is configured to forward a control instruction from the deck equipment to the detector and the propeller, and forward data acquired by the detector to the deck equipment.

In an embodiment, the detector comprises side-scan sonar and a signal converter. The side-scan sonar is installed at a belly of the main body. The main body comprises an electronic cabin, and the signal converter is installed in the electronic cabin and electrically connected to the side-scan sonar and the deck equipment. The signal converter is configured to convert acoustic information acquired by the side-scan sonar into digital information and transmit the digital information to the deck equipment.

In an embodiment, the detector includes an attitude sensor, a depth sensor, and a speed sensor. The attitude sensor is arranged in the main body and coincides with the center of gravity of the main body. The depth sensor and the speed sensor each comprises a test terminal exposed from the main body to contact water.

In an embodiment, the detector comprises a camera assembly. The camera assembly is disposed at the forward end of the main body. A protection frame is disposed around the camera assembly at the forward end of the main body.

In an embodiment, the underwater sonar device further comprises a main communication board. The main communication board is electrically connected to the controller and the deck equipment. The control instruction from the deck equipment is transmitted to the controller via the main communication board, and the data received by the controller is transmitted to the deck equipment via the main communication board.

In an embodiment, the underwater sonar device further comprises a transducer array of an inverted ultra-short baseline positioning system. The transducer array is paired with a response beacon of the reverse ultrashort baseline positioning system, and the response beacon is disposed on the towing vessel. A coordinate system established by the transducer array is in coincidence with a machine coordinate system of the underwater sonar device. Additionally or alternatively, vertical tail fins are disposed at an upper side and a bottom side of the aft end of the main body. Additionally or alternatively, another buoyancy material is disposed at a central position at the back of the main body.

In an embodiment, a towing terminal is disposed at the position corresponding to the center of gravity on the back of the main body. The towing terminal penetrates the hydrofoil and has a drawing point. The drawing point is configured to establish a physical connection between the sonar device and the towing vessel via an umbilical cable. The main body further comprises with an electronic connector. The electronic connector is configured to establish an electrical connection and a communication connection between the sonar device and the towing vessel via the umbilical cable.

In an embodiment, the towing terminal comprises a fixture, a connector, and a security pin. The fixture is fixed to the position corresponding to the center of gravity on the back of the main body, and at an upper end of the fixture comprises a connecting hole. The connector has the drawing point, and is fixed to the connecting hole via the security pin. The underwater sonar device further comprises a security cable. An end of the security cable is connected to the connector, and another end of the security cable is connected to the main body at a position located between the fixture and the aft end of the main body. The security pin is capable to break under a predetermined force. The security cable is capable to serve as a connection between the umbilical cable and the main body and enable the main body to pitch downward when the security pin breaks.

An underwater detecting system is further provided according to embodiments of the present disclosure. The underwater detecting system comprises a towing vessel, an umbilical cable, and the aforementioned underwater sonar device. The umbilical cable is configured to connect the towing vessel and the underwater sonar device to provide a physical connection, an electrical connection, and a communication connection between the towing vessel and the underwater sonar device.

Herein the underwater detecting system comprises the aforementioned underwater sonar device, and hence has same technical effects as the aforementioned underwater sonar device.

In an embodiment, the towing vessel comprises deck equipment and a computer configured to run integrated measurement-and-control software. The deck equipment is electrically connected to the computer and the underwater sonar device. The integrated measurement-and-control software when executed is configured to receive an inputted control instruction. The deck equipment is configured to forward the control instruction to the underwater sonar device and forward data from the underwater sonar device to the computer running the integrated measurement-and-control software.

Embodiments of the present disclosure have following beneficial effects.

First, the underwater sonar device gets rid of a frame structure of carriers in conventional technology. The main body is configured as the axisymmetric structure, which effectively reduces a dead weight of the device, reduces navigation resistance of the device, and improves navigation ability of the device. Moreover, the hydrofoil assembly is provided for autonomous adjustment on a navigation depth when the device is towed. Hence, that the device navigates at a fixed depth without ascending even at a high navigation speed, which meets a requirement of deep-sea detection. In addition, the propeller is provided to adjust an attitude and a depth of the detection, such that the device is capable navigate autonomously at a low speed, which controls a range of the detection effectively and reduces time consumption of, for example, detecting and confirming a target. Various requirements such as approaching the target for detailed measurement, evidence acquisition, and other data collection are met.

| 1 | main body, | 11 | main control cabin, |
|---|---|---|---|
| 12 | electronic cabin, | 2 | hydrofoil assembly, |
| 21 | hydrofoil, | 22 | elastic component, |
| 23 | hinge base, | 231 | limit wall, |
| 31 | longitudinal propeller, | 32 | transverse propeller, |
| 33 | vertical propeller, | 4 | transverse tail fin, |
| 51 | side-scan sonar, | 52 | camera assembly, |
| 53 | protection frame, | 6 | transducer array, |
| 7 | vertical tail fin, | 81 | towing terminal, |
| 811 | fixture, | 812 | connector, |
| 813 | security pin, | 82 | electronic connector, |
| 9 | security cable, | 10 | another protection frame, |
| A | buoyant material. | | |

DETAILED DESCRIPTION OF EMBODIMENTS

In order to facilitate those skilled in the art understanding technical solutions according to the present disclosure, hereinafter the present disclosure is described in detail in conjunction with the drawings and embodiments.

Herein terms such as "first" and "second" are only intended for distinguishing two or more structures or components that have identical or similar structure and/or functions, and do not indicate any special limitation on an order and/or importance.

Figure 4:
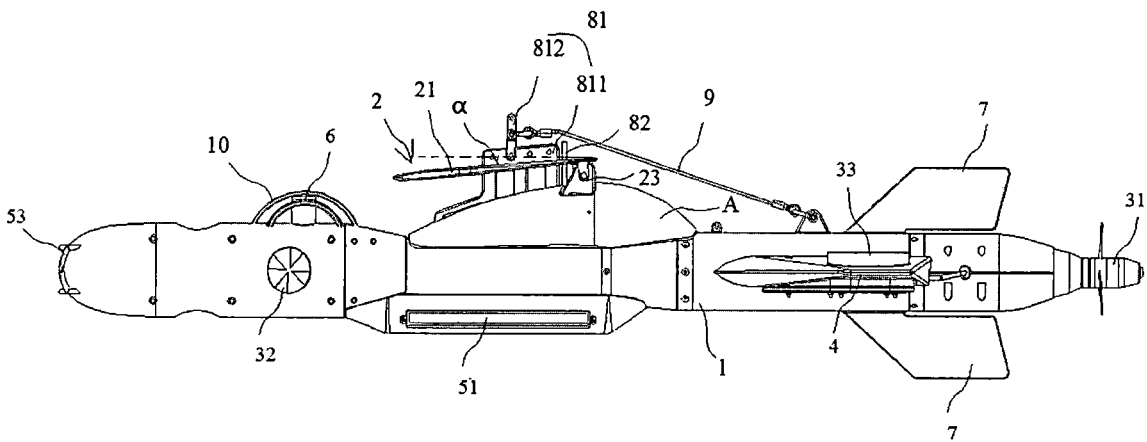
FIG. 4 is a structural schematic view of an underwater sonar device as shown in FIG. 1 when navigating at a low speed.

Taking the view as shown in FIG. 4 as an example, a longitudinal direction is along a length of the main body 1 and points from aft to forward, a transverse direction is perpendicular to the paper surface and points into the paper, and a vertical direction points from bottom to top. Moreover, a back of the main body 1 refers to its upper surface, and a belly of the main body 1 refers to its bottom surface.

Herein a side of the hydrofoil 21 facing the main body 1 is called an inner side wall.

Figure 1:
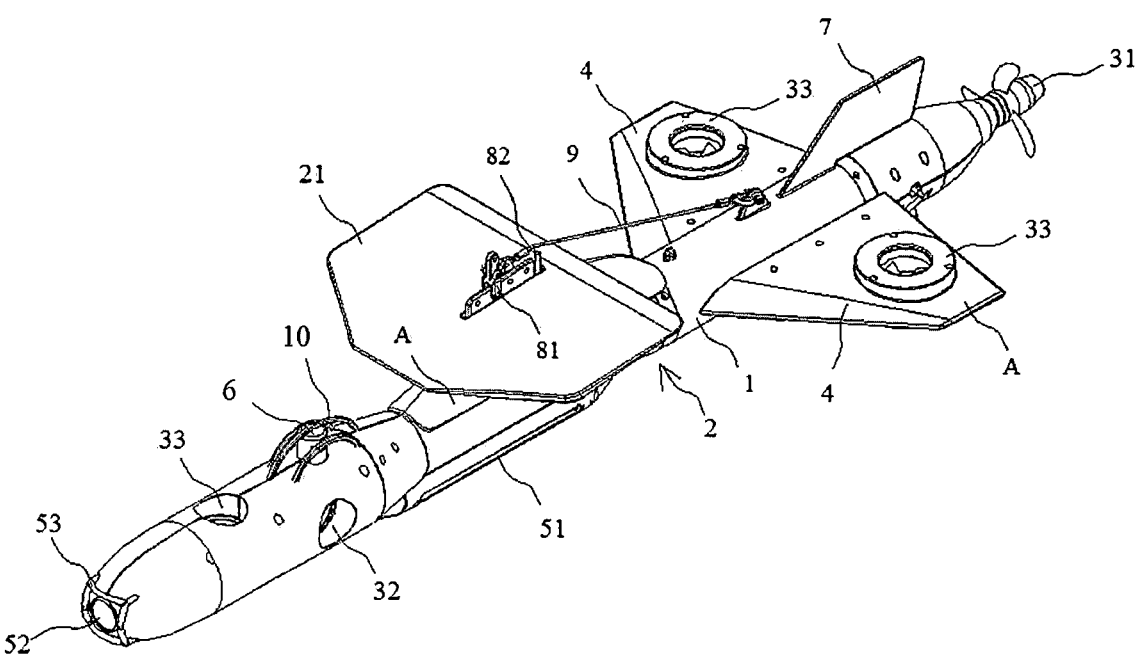
FIG. 1 is a structural schematic view of an underwater sonar device from a first direction according to an embodiment of the present disclosure.
Figure 2:
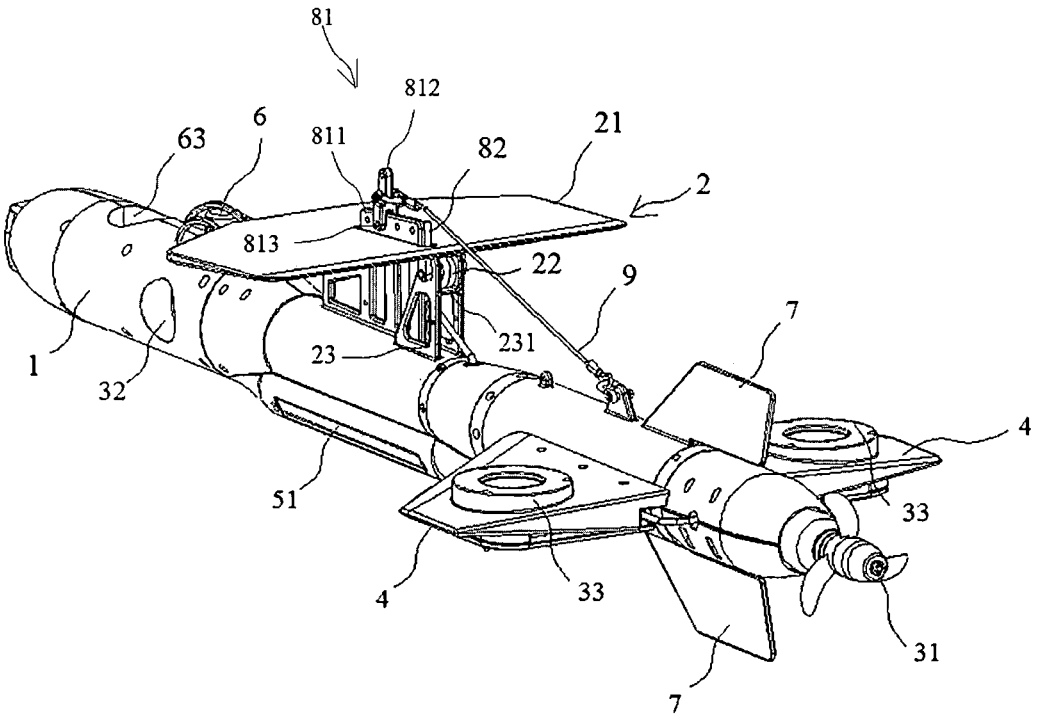
FIG. 2 is a structural schematic view of an underwater sonar device as shown in FIG. 1 from a second direction.
Figure 3:
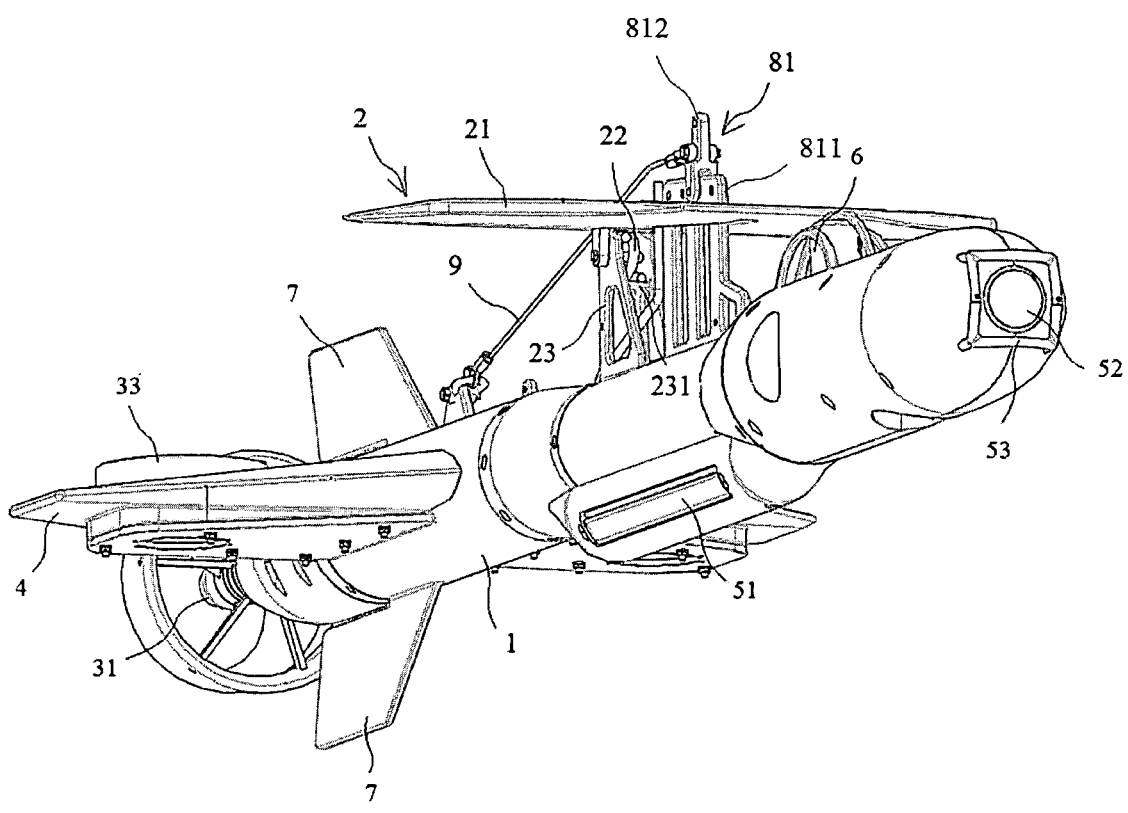
FIG. 3 is a structural schematic view of an underwater sonar device as shown in FIG. 1 from a third direction.
Figure 5:
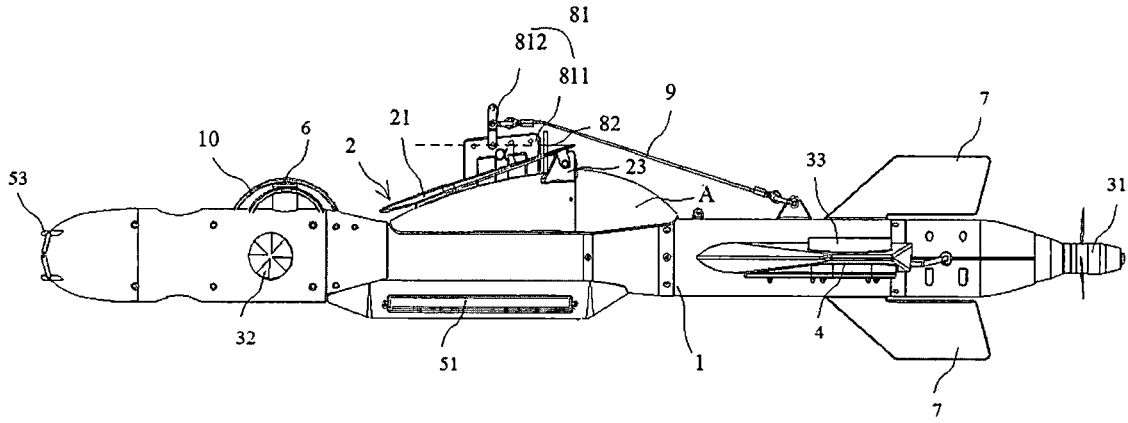
FIG. 5 is a structural schematic view of an underwater sonar device as shown in FIG. 1 when navigating at a high speed.
Figure 6:
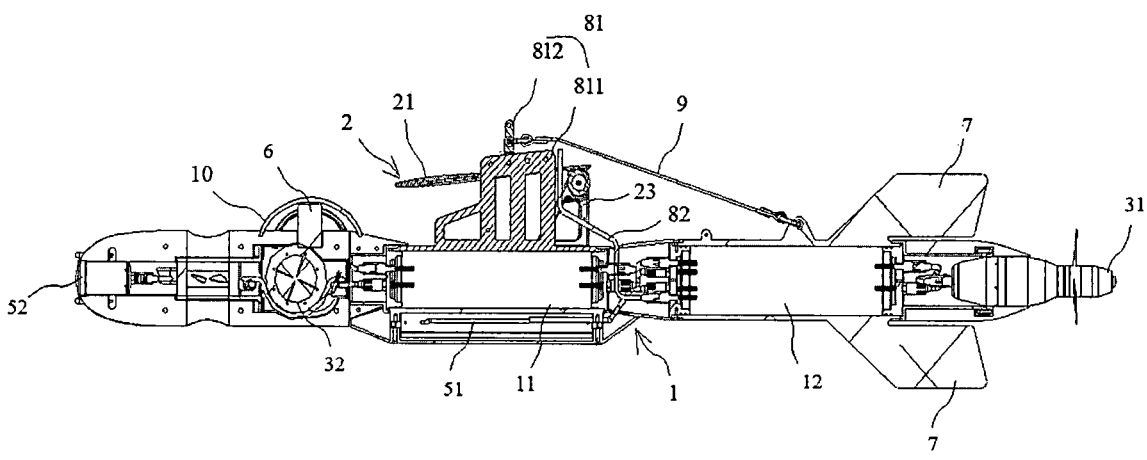
FIG. 6 is an axial cross-sectional view of an underwater sonar device as shown in FIG. 1.
Figure 7:
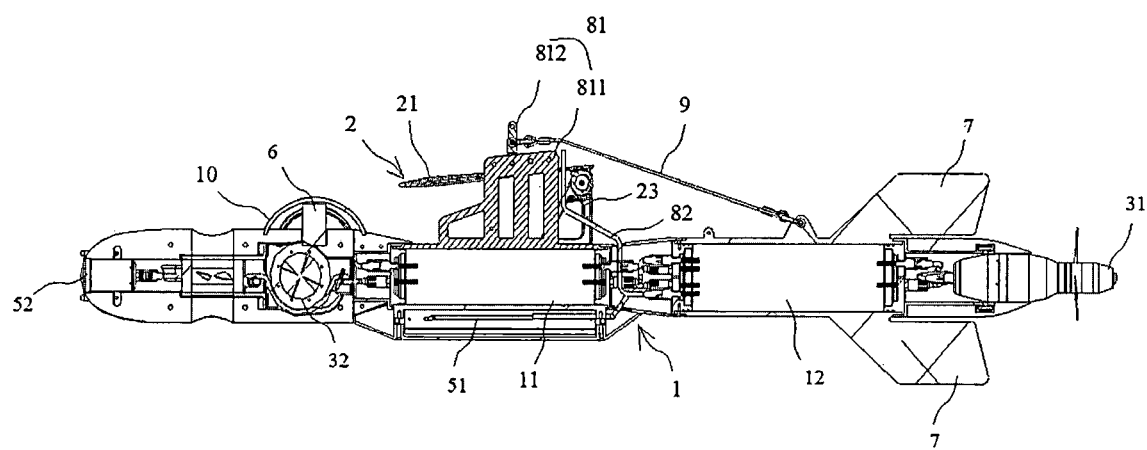
FIG. 7 is a structural schematic view of an underwater sonar device as shown in FIG. 1 from a fourth direction.
Figure 8:
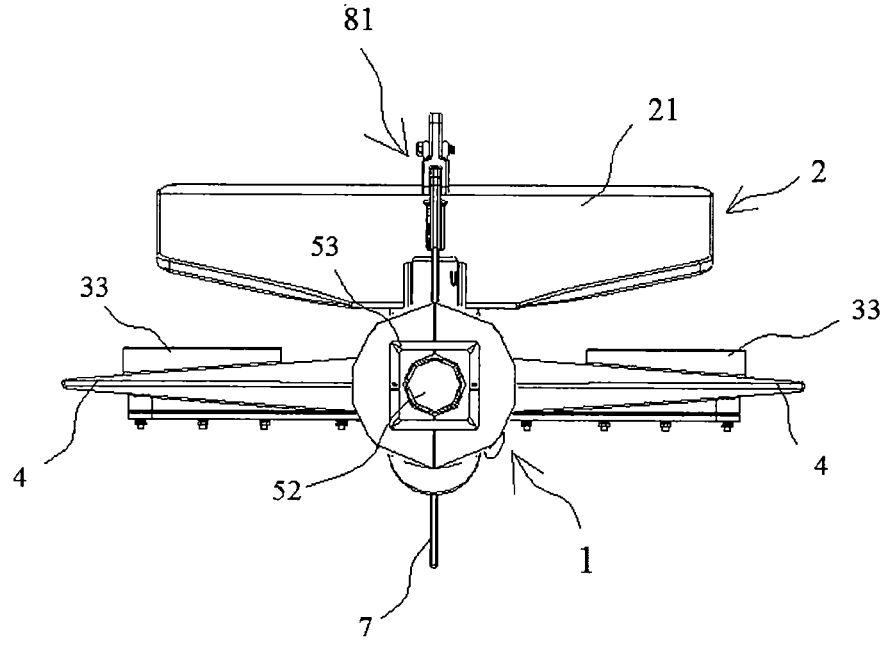
FIG. 8 is a structural schematic view of an underwater sonar device as shown in FIG. 1 from a fifth direction.

Reference is made to FIG. 1 to FIG. 8. FIG. 1 is a structural schematic view of an underwater sonar device from a first direction according to an embodiment of the present disclosure. FIG. 2 is a structural schematic view of an underwater sonar device as shown in FIG. 1 from a second direction. FIG. 3 is a structural schematic view of an underwater sonar device as shown in FIG. 1 from a third direction. FIG. 4 is a structural schematic view of an underwater sonar device as shown in FIG. 1 when navigating at a low speed. FIG. 5 is a structural schematic view of an underwater sonar device as shown in FIG. 1 when navigating at a high speed. FIG. 6 is an axial cross-sectional view of an underwater sonar device as shown in FIG. 1. FIG. 7 is a structural schematic view of an underwater sonar device as shown in FIG. 1 from a fourth direction. FIG. 8 is a structural schematic view of an underwater sonar device as shown in FIG. 1 from a fifth direction.

An underwater sonar device is provided according to embodiments of the present disclosure. The underwater sonar device comprises a main body 1, a propeller, a detector and a hydrofoil assembly 2. The main body is an axisymmetric structure. The propeller, the detector, and the hydrofoil assembly 2 are all disposed on the main body 1.

The detector is configured to detect and image an underwater target.

The propeller is configured to drive the main body 1 to move along a longitudinal direction and a vertical direction, and control a pitch angle, a roll angle, and a yaw angle of the main body.

The hydrofoil assembly 2 is arranged at a back of the main body 1, and is configured to adjust an included angle between the hydrofoil assembly 2 and the longitudinal direction of the main body 1 automatically based on water resistance on the hydrofoil assembly 2, so as to maintain a force balance on the main body along the vertical direction and keep the sonar device navigating at a fixed depth.

First, the underwater sonar device gets rid of a frame structure of carriers in conventional technology. The main body 1 is configured as the axisymmetric structure, which effectively reduces a dead weight of the device, reduces navigation resistance of the device, and improves navigation ability of the device. Moreover, the hydrofoil assembly 2 is provided. The hydrofoil assembly 2 adjusts an included angle between itself and the longitudinal direction of the main body 1 automatically under different water resistance, and thereby achieves autonomous adjustment on a navigation depth when the device is towed. Hence, that the device navigates at a fixed depth without ascending even at a high navigation speed, which meets a requirement of deep-sea detection. In addition, the propeller is provided to adjust an attitude and a depth of the detection, such that the device is capable navigate autonomously at a low speed, which controls a range of the detection effectively and reduces time consumption of, for example, detecting and confirming a target. Various requirements such as approaching the target for detailed measurement, evidence acquisition, and other data collection are met.

In one embodiment, the hydrofoil assembly 2 comprises a hydrofoil 21 and an elastic component 22. The hydrofoil 21 is hinged to a position at the back of the main body 1, and the position corresponds to a center of gravity of the main body 1. The elastic component 22 is arranged between the hydrofoil 21 and the main body 1. The hydrofoil 21 is rotatable around the position under the water resistance and an elastic force applied by the elastic component 22.

In a case that the underwater sonar device navigates at a low speed, water resistance on the hydrofoil 21 is small. There is an angle between the hydrofoil 21 and the longitudinal direction of the main body 1 under the water resistance and the elastic force applied by the elastic component 22. As shown in FIG. 4, the included angle between a plane of the hydrofoil 21 and the longitudinal direction of the main body 1 is defined as a, which ranges from 3 degrees to 5 degrees in such case. Water flows along a surface of the hydrofoil 21 and hence generates an obliquely downward pressure on the main body 1. The pressure compensates a drawing force applied by a towing vessel on the underwater sonar device, thereby balancing forces on the device along the vertical direction. Therefore, the device keeps navigating at a fixed depth without ascending gradually. In a case that the underwater sonar device navigates at a higher speed, the water resistance on the hydrofoil 21 increases and the hydrofoil 21 rotates around a hinge towards the main body 1. As shown in FIG. 5, the included angle between the plane of the hydrofoil 21 and the longitudinal direction of the main body 1 is around 15 degrees. Water flowing along the surface of the hydrofoil 21 generates a greater obliquely downward pressure on the main body 1. The greater pressure still compensates the drawing force applied by the towing vessel on the underwater sonar device, which rebalances forces on the device along the vertical direction. Hence, the device navigates at a fixed depth.

The elastic component 22 of the hydrofoil assembly 2 may be a torsion spring. Reference is made to FIG. 3. The hydrofoil assembly 2 further comprises a hinge base 23 arranged on the back of the main body 1. The hydrofoil 21 is connected to the hinge base 23 via a hinge shaft, and the hinge base comprises a limit wall. The torsion spring serves as a sleeve outside the hinge shaft. A leg of the torsion spring abuts against an inner side wall of the hydrofoil assembly 21, and another leg of the torsion spring abuts against the limit wall.

When the navigation speed of the device increases, the water resistance on the device increases gradually. The hydrofoil 21 compresses the torsion spring to rotate towards the main body 1. An angle between two legs of the torsion spring decreases gradually and the torsion spring stores energy. When the navigation speed of the device decreases, the water resistance on the device decreases gradually. The hydrofoil 21 rotates away from the main body 1 under a force due to restoration of the torsion spring. Thereby, the hydrofoil 21 is automatically adjusted. The elastic component 22 is not limited to the foregoing torsion spring. For example, the elastic component 22 may be a spiral spring.

An end of the spiral spring is fixedly connected to the main body 1, and another end of the spiral spring is fixedly connected to the inner side wall of the hydrofoil 21.

A shape and an area of the hydrofoil 21 may be adaptively designed based on parameters such as a weight of the main body 1 in the water, so as to ensure stable navigation.

Further, the propeller comprises a longitudinal propeller 31, a transverse propeller 32, and vertical propellers 33.

The longitudinal propeller 31 is disposed at an aft end of the main body 1 and is configured to drive the main body 1 to move along the longitudinally direction.

The transverse propeller 32 is disposed at a lateral side of a forward end of the main body 1 and is configured to control the yaw angle of the main body 1.

Transverse tail fins 4 are disposed at two lateral sides, respectively, of the aft end of the main body. The vertical propellers 33 are disposed at the back of the main body 1 at the forward end and at two transverse tail fins 4, respectively. The vertical propellers 33 are configured to control the main body to move along the vertical direction and control the pitch angle and the roll angle of the main body 1.

For example, in a case that the vertical propeller 33 at the forward end and the two vertical propellers 33 at the aft end each provides an upward lift, the main body 1 moves upward along the vertical direction. In a case that the vertical propeller 33 at the forward end and the two vertical propellers 33 at the aft end each provides a downward force, the main body 1 moves downward along the vertical direction. Thereby, vertical movement of the main body 1 is achieved.

In a case that the vertical propeller 33 at the forward end provides an upward lift and both the two vertical propellers 33 at the aft end provide a downward force, the main body 1 pitches upward by a certain elevation angle. In such case, a thrust provided by the longitudinal propeller 31 makes device float rapidly. In a case that the vertical propeller 33 at the forward end provides a downward force and both the two vertical propellers 33 at the aft end provides an upward lift, the main body 1 pitches downward by a certain depression angle. In such case, a thrust provided by the longitudinal propeller 31 makes the device sink rapidly. Thereby, the pitching angle of the main body 1 is controlled.

In a case that one of the two vertical propellers 33 at the aft end provides an upward lift while the other provides a downward force, the roll angle of the main body 1 is controlled.

Herein the propeller is provided to achieve autonomous navigation of the underwater sonar device at a low speed. A requirement on fast detection of a target within a wide range is met. Various requirements such as approaching the target for detailed measurement, evidence acquisition, and other data collection are also met.

In one embodiment, a buoyancy material A is arranged at an upper side of each transverse tail fin 4, so as to provide static buoyancy on the sonar device.

Reference is further made to FIG. 6. The underwater sonar device may further comprise a controller. The controller is accommodated in a main control cabin 11. The controller is electrically connected with deck equipment of the towing vessel, the detector, and the propeller. The controller is configured to forward a control instruction from the deck equipment to the detector and the propeller, so as to adjust an operation state of the sonar device. The controller is further configured to forward data acquired by the detector to the deck equipment.

The detector may comprise side-scan sonar 51. The side-scan sonar 51 is installed on a belly of the main body.

The main body 1 may comprise an electronic cabin 12, and the detector may further comprise a signal converter, which is installed in the electronic cabin 12 and electrically connected to the side-scan sonar 51 and the deck equipment. The signal converter is configured to convert acoustic information acquired by the side-scan sonar 51 into digital information and transmit the digital information to the deck equipment.

Thereby, side scan can fully cover a target region of the sea floor via the side-scan sonar 51. Topography, an acoustic structure, and a material property of the sea floor are analyzed to implement acoustic detection on the sea floor.

In addition, the side scan sonar 51 may be covered with a deflector configured to reduce navigation resistance and improve navigation endurance.

In one embodiment, the detector includes an attitude sensor, a depth sensor, and a speed sensor. The attitude sensor is arranged in the main body 1 and coincides with the center of gravity of the main body. The attitude sensor is configured to acquire an attitude signal of the device in real time. The depth sensor and the speed sensor each comprises a test terminal exposed from the main body 1 to contact water. The depth sensor is configured to acquire a navigation depth of the device in real time, and the speed sensor is configured to acquire a navigation speed of the device in real time. The acquired information is transmitted to the towing vessel, such that detection personnel can control the operation state of the underwater sonar device accurately.

Generally, the speed sensor is a DVL (Doppler velocity log). A probe of such sensor is installed at the belly of the main body 1 and points downward to acquire a relative speed of the main body 1 with respect to the sea floor.

In addition, the detector may include a camera assembly 52. The camera assembly comprises 52 a camera and a fill light. The camera assembly 52 is arranged at the forward end of the main body. Submarine optical detection can be performed via the camera assembly 52. A protection frame is disposed around the camera assembly 52 at the forward end of the main body, so as to prevent the camera assembly 52 from being damaged and improve a service life of the camera assembly 52.

In one embodiment, the underwater sonar device further comprises a main communication board. The main communication board is electrically connected to the controller and the deck equipment, and is capable to store data. The control instruction from the deck equipment is first stored in the main communication board and then transmitted to the controller. The data received by the controller is also first stored in the main communication board and then transmitted to the deck equipment.

Reference is made to FIG. 6. An inverted ultra-short baseline positioning system may be further provided. The reverse ultrashort baseline positioning system comprises a response beacon and a transducer array 6. The response beacon is disposed on the towing vessel. The transducer array 6 is disposed on the underwater sonar device, and is installed in coincidence with a machine coordinate system of the underwater sonar device.

The machine coordinate system of the underwater sonar device is defined by the transverse direction, the longitudinal direction, and the vertical direction as mentioned above. The transducer array 6 being installed in coincidence with the machine coordinate system of the underwater sonar device refers to each installation plane of the transducer array 6 is either parallel or perpendicular to axis of the machine coordinate system of the underwater sonar device. In practice, installation accuracy of the transducer array 6 can be guaranteed through abutting against mechanical alignment block(s) during installation.

In conventional technology, when using ultra-short baseline positioning, a response beacon is installed on a sonar device while a transducer array is installed at a bottom of a towing vessel. Due to a large volume and a large weight of the towing vessel, an attitude sensor is usually installed at the transducer array, so as to reduce an error due to phase variation of a vessel body when calculating based on an attitude of the vessel. Herein the installation is reversed, i.e., the response beacon is arranged on the towing vessel while the transducer array 6 is arranged on the underwater sonar device. It is unnecessary to arrange the additional attitude sensor, which effectively reduces a cost.

In addition, another protection frame 10 is further disposed outside the transducer array 6, so as to prevent the transducer array 6 from being damaged and improve a service life of the transducer array 6.

Reference is made to FIG. 1 to FIG. 7. Vertical tail fins 7 may be further provided at an upper side and a bottom side of the aft end of the main body, so as to improve navigation stability of the device.

Reference is made to FIG. 4 to FIG. 6. A towing terminal 81 may be disposed at the position corresponding to the center of gravity on the back of the main body. The towing terminal 81 penetrates the hydrofoil 21 and has a drawing point. The drawing point is configured to establish a physical connection between the sonar device and the towing vessel via an umbilical cable. The main body 1 further comprises with an electronic connector 82. The electronic connector 82 is configured to establish an electrical connection and a communication connection between the sonar device and the towing vessel via the umbilical cable.

Thereby, herein the underwater sonar device establishes the physical connection with the towing vessel via the umbilical cable. When the underwater sonar device is towed by the towing vessel to navigate at a high speed, the underwater sonar device is in a high-speed towed navigation mode. In this mode, the operation state of the underwater sonar device may be adjusted based on a weight of the underwater sonar device, a navigation speed of the towing vessel, and a length of the tethered cable. In addition, the underwater sonar device also establishes the electrical connection and the communication connection with the towing vessel via the umbilical cable. That is, the towing vessel supplies power to loads in the sonar device via the umbilical cable, and the towing vessel communicates with the device via the umbilical cable.

As shown in FIG. 2, the towing terminal 81 comprises a fixture 812, a connector 822, and a security pin 823. The fixture 811 is fixed to the position corresponding to the center of gravity on the back of the main body 1, and at an upper end of the fixture 811 comprises a connecting hole. The connector 812 has the drawing point, and is fixed to the connecting hole via the security pin 813. The security pin 813 is capable to break under a predetermined force.

The underwater sonar device further comprises a security cable 9. An end of the security cable 9 is connected to the connector 812, and another end of the security cable is connected to the main body 1 at a position located between the fixture 811 and the aft end of the main body 1.

Thereby, during normal navigation, the security cable 9 improves strength of the towing terminal 81, which improves reliability of the connection between the towing vessel and the main body 1. In a case that the device is trapped by an obstacle such as fishing nets, the drawing force applied by the umbilical cable on the security pin 813 grows greater than the predetermined force, and hence the security pin 813 breaks. In such case, the main body 1 is connected to the towing vessel only via the security cable 9, and connection point between the umbilical cable and the main body 1 is transferred from the position corresponding to the center of gravity to a position near the aft end. Due to dragging of the umbilical cable, the main body 1 pitches by a large angle, where the aft end of the main body 1 moves upward while the forward end moves downward. Consequently, the device escapes from the obstacle and is pulled back to the towing vessel, and a new security pin is installed. The device can return usage after maintenance.

A quantity of the connecting holes provided at the upper end of the fixture 811 is not limited. There may be one or more connecting holes. Multiple connecting holes may be distributed along the longitudinal direction of the main body 1. The connector 812 is fixed to an arbitrary connecting hole via the security pin 813. More connecting holes facilitate adjustment on a position of the drawing point, which ensures force balance of the main body 1 and thereby ensures the navigation stability of the main body 1. The security cable 9 may be a steel cable with an appropriate breaking force.

Different lengths of the umbilical cable may correspond to different communication modes. For example, in a case that the length of the umbilical cable is not more than 200 meters, a multi-core Ethernet communication mode which directly connects the deck equipment with communication apparatuses in the sonar device may be applied. In a case that the length of the umbilical cable is not more than 500 meters, a two-core modulation-demodulation communication mode may be applied to connect the deck equipment with the main communication board, where the deck equipment and the main communication board each has a modulation-demodulation circuit. In a case that the length of the umbilical cable exceeds 500 meters, an optical-fiber communication mode may be applied, where the deck equipment and the main communication board each has a conversion circuit for optical-fiber communication.

As shown in FIG. 4 and FIG. 5, a buoyancy material A (not depicted in other Figures) is provided close to a central position of the back of the main body 1, so as to provide static buoyancy for the sonar device.

An underwater detecting system is further provided according to embodiments of the present disclosure. The underwater detecting system comprises a towing vessel, an umbilical cable, and the aforementioned underwater sonar device. The umbilical cable is configured to connect the towing vessel and the underwater sonar device, so as to provide a physical connection, an electrical connection, and a communication connection between the towing vessel and the underwater sonar device.

Herein the underwater detecting system comprises the aforementioned underwater sonar device, and hence has same technical effects as the aforementioned underwater sonar device.

The physical connection refers to that the towing vessel provides the drawing force on the underwater sonar device via umbilical cable. The electrical connection refers to that the towing vessel supplies power to power loads of the underwater sonar device via the umbilical cable. The communication connection refers to that the towing vessel communicates with the underwater sonar device via the umbilical cable.

In an embodiment, the towing vessel comprises deck equipment and a computer configured to run integrated measurement-and-control software. The deck equipment is electrically connected to the computer and the underwater sonar device. The integrated measurement-and-control software when executed is configured to monitor a real-time operation state of the underwater sonar device and issue a control instruction to the controller, so as to achieve a specific navigation task such as data acquisition, synchronous processing, event marking and processing, and data storage and playback. The deck equipment serves as a data communication relay. The deck equipment is configured to forward the control instruction to the underwater sonar device, so as to control the propeller and the detector to adjust the operation state of the underwater sonar device. The deck equipment is further configured to forward data from the underwater sonar device to the computer running the integrated measurement-and-control software.

In addition, the deck equipment is further configured to provide a power conversion function for the towing vessel. That is, the deck equipment converts a voltage on the towing vessel to a voltage required by the power loads, so as to supply power to the power loads.

Hereinabove the underwater sonar device and the underwater detecting system are described in detail. Specific examples are used to explain the principle and embodiments of the present disclosure. Illustration of the above embodiments is only intended for helping understand a solution and a core concept of the present disclosure. Those skilled in the art can make various improvements and modifications to the present disclosure without departing from the principle of the present disclosure, and these improvements and modifications shall fall within the protection scope of the claims of the present disclosure.

The invention claimed is:

1. An underwater sonar device, comprising: a main body, a propeller, a detector and a hydrofoil assembly, wherein:
the main body is an axisymmetric structure;
the propeller, the detector, and the hydrofoil assembly are disposed on the main body;
the detector is configured to detect and image an underwater target;
the propeller is configured to drive the main body to move along a longitudinal direction and a vertical direction, and control a pitch angle, a roll angle, and a yaw angle of the main body;
the hydrofoil assembly is disposed at a back of the main body, and is configured to adjust an included angle between the hydrofoil assembly and the longitudinal direction of the main body automatically based on water resistance on the hydrofoil assembly to keep the sonar device navigating at a fixed depth.

2. The underwater sonar device according to claim 1, wherein the hydrofoil assembly comprises:
a hydrofoil hinged to a position at the back of the main body, wherein the position corresponds to a center of gravity of the main body; and
an elastic component, disposed between the hydrofoil and the main body, wherein the hydrofoil is rotatable around the position under the water resistance and an elastic force applied by the elastic component.

3. The underwater sonar device according to claim 2, wherein:
the hydrofoil assembly further comprises a hinge base disposed on the back of the main body;
the hydrofoil is connected to the hinge base via a hinge shaft;
the elastic component is a torsion spring which serves as a sleeve outside the hinge shaft, a leg of the torsion spring abuts against an inner side wall of the hydrofoil assembly, and another leg of the torsion spring abuts against a limit wall of the hinge base.

4. The underwater sonar device according to claim 1, wherein the propeller comprises:
a longitudinal propeller disposed at an aft end of the main body, wherein the longitudinal propeller is configured to drive the main body to move along the longitudinal direction;
a transverse propeller disposed at a lateral side of a forward end of the main body, wherein the transverse propeller is configured to control the yaw angle of the main body; and
vertical propellers disposed at the back of the main body at the forward end and at two transverse tail fins, respectively, wherein the two transverse tail fins are disposed at two lateral sides, respectively, of the aft end of the main body, and the vertical propellers are configured to control the main body to move along the vertical direction and control the pitch angle and the roll angle of the main body.

5. The underwater sonar device according to claim 4, wherein a buoyancy material is arranged at an upper side of each of the two transverse tail fins.

6. The underwater sonar device according to claim 1, further comprising a controller, wherein:
the main body comprises a main control cabin, and the controller is disposed in the main control cabin;
the controller is electrically connected to deck equipment of a towing vessel, the detector, and the propeller; and
the controller is configured to forward a control instruction from the deck equipment to the detector and the propeller, and forward data acquired by the detector to the deck equipment.

7. The underwater sonar device according to claim 6, wherein the detector comprises:
side-scan sonar installed at a belly of the main body;
a signal converter installed in an electronic cabin and electrically connected to the side-scan sonar and the deck equipment, wherein the main body comprises an electronic cabin, and the signal converter is configured to convert acoustic information acquired by the side-scan sonar into digital information and transmit the digital information to the deck equipment.

8. The underwater sonar device according to claim 6, wherein the detector comprises:
an attitude sensor, arranged in the main body and coinciding with the center of gravity of the main body;
a depth sensor and a speed sensor, each comprising a test terminal exposed from the main body to contact water.

9. The underwater sonar device according to claim 6, wherein the detector comprises a camera assembly, wherein:
the camera assembly is disposed at the forward end of the main body, and a protection frame is disposed around the camera assembly at the forward end of the main body.

10. The underwater sonar device according to claim 6, further comprising a main communication board electrically connected to the controller and the deck equipment, wherein:
the control instruction from the deck equipment is transmitted to the controller via the main communication board, and the data received by the controller is transmitted to the deck equipment via the main communication board.

11. The underwater sonar device according to claim 1, further comprising a transducer array of an inverted ultra-short baseline positioning system, wherein:

the transducer array is paired with a response beacon of the reverse ultrashort baseline positioning system, and the response beacon is disposed on a towing vessel; and a coordinate system established by the transducer array is in coincidence with a machine coordinate system of the underwater sonar device.

12. The underwater sonar device according to claim 1, wherein vertical tail fins are disposed at an upper side and a bottom side of the aft end of the main body.

13. The underwater sonar device according to claim 1, wherein a buoyancy material is disposed at a central position at the back of the main body.

14. The underwater sonar device according to claim 1, wherein:

a towing terminal is disposed at the position corresponding to the center of gravity on the back of the main body;

the towing terminal penetrates the hydrofoil and has a drawing point;

the drawing point is configured to establish a physical connection between the sonar device and a towing vessel via an umbilical cable;

the main body further comprises an electronic connector, and the electronic connector is configured to establish an electrical connection and a communication connection between the sonar device and the towing vessel via the umbilical cable.

15. The underwater sonar device according to claim 14, wherein the towing terminal comprises:

a fixture, fixed to the position corresponding to the center of gravity on the back of the main body, wherein at an upper end of the fixture comprises a connecting hole;

a security pin; and a connector having the drawing point, wherein the connector is fixed to the connecting hole via the security pin;

wherein the underwater sonar device further comprises a security cable, an end of the security cable is connected to the connector, and another end of the security cable is connected to the main body at a position located between the fixture and the aft end of the main body;

wherein the security pin is capable to break under a predetermined force; and wherein the security cable is capable to serve as a connection between the umbilical cable and the main body and enable the main body to pitch downward when the security pin breaks.

16. An underwater detecting system, comprising:

a towing vessel, an umbilical cable, and the underwater sonar device according to claim 1;

wherein the umbilical cable is configured to connect the towing vessel and the underwater sonar device to provide a physical connection, an electrical connection, and a communication connection between the towing vessel and the underwater sonar device.

17. The underwater detecting system according to claim 16, wherein the towing vessel comprises:

deck equipment; and a computer, configured to run integrated measurement-and-control software, wherein:

the deck equipment is electrically connected to the computer and the underwater sonar device;

the integrated measurement-and-control software when executed is configured to receive an inputted control instruction; and the deck equipment is configured to forward the control instruction to the underwater sonar device and forward data from the underwater sonar device to the computer running the integrated measurement-and-control software.

* * * * *